United States Patent

[11] 3,587,994

[72] Inventor Donald L. Freed, Jr.
Belleville, Ill.
[21] Appl. No. 885,744
[22] Filed Dec. 29, 1969
[45] Patented June 28, 1971
[73] Assignee National Mine Service Company
Pittsburgh, Pa.

[54] SPOOLING DEVICE
8 Claims, 3 Drawing Figs.
[52] U.S. Cl. ................................................ 242/158.3,
74/57
[51] Int. Cl. .................................................B65h 54/28,
F16h 25/12
[50] Field of Search ........................................ 242/158.3,
158.2, 158, 158.4, 43; 74/57, 424.8

[56] References Cited
UNITED STATES PATENTS
| | | | |
|---|---|---|---|
| 1,632,875 | 6/1927 | Bouvier | 242/158.3 |
| 1,875,467 | 9/1932 | Knoerzer et al. | 242/158.3 |
| 2,134,369 | 10/1938 | Merwin | 242/158.3 |
| 2,801,534 | 3/1957 | Astley | 242/158.3UX |
| 2,962,906 | 12/1960 | Cornish | 242/158.3X |

Primary Examiner—Stanley N. Gilreath
Attorney—Stanley J. Price, Jr.

ABSTRACT: A spooling device for distributing a flexible strand along more than one length of traverse has a spooling shaft rotatably supported in a frame member. A cable guide bracket is slidably mounted on a frame member and has a central rectangular bore therethrough. A spooling nut is mounted in the rectangular bore of the cable guide bracket and the dimensions of the cable guide member rectangular bore are greater than the dimensions of the spooling nut so that the spooling nut floats therein. The spooling nut has a central circular aperture therethrough with a diameter larger than the diameter of the spooling shaft that extends therethrough. Bushings positioned between the shaft and the nut maintain the radial and coaxial relationship of the nut to the shaft. Guide members are positioned in transverse bores in the guide bracket and have portions extending into apertures in the spooling nut. An indexing pin having an inner arcuate surface is positioned in the spooling nut and guide bracket with the inner arcuate surface extending into the threaded grooves of the spooling shaft. A resilient means urges the arcuate surface toward the spooling shaft. The above arrangement provides a floating connection between the spooling nut and the cable guide member so that radial deflection of the guide member relative to the shaft does not transmit destructive radial forces to the spooling shaft from the cable guide bracket. The cable guide bracket deflects radially relative to the spooling shaft when it is subjected to torsional forces by cable tension.

PATENTED JUN28 1971

3,587,994

INVENTOR.
DONALD L. FREED, JR.
BY Stanley J. ...
his Attorney.

3,587,994

SPOOLING DEVICE

BACKGROUND OF THE INVENTION

1. Field of the Invention

This invention relates to a spooling device and more particularly to a spooling device having a floating connection between the strand guide bracket and the spooling nut.

2. Description of the Prior Art

Strand winding apparatus that has a double-threaded spooling shaft drivingly connected to the strand takeup reel is well known in the art. U.S. Pat. No. 2,134,369 illustrates a known strand winding device that has a double-threaded or grooved spooling shaft positioned between two spaced parallel rods of a frame member. A strand guide bracket is positioned to move reciprocally on the rods and has a follower pivotally supported therein. The follower has an arcuate end portion positioned in the threaded recessed portion of the spooling shaft. Other examples of strand winding devices that include a rotatable spooling shaft that guides a bracket transversely to distribute the strand on a reel are disclosed in U.S. Pat. Nos. 890,213; 1,632,875; 1,875,467; and 2,962,906.

All of the known strand winding devices are constructed so that the spooling shaft is subjected to radial forces when the guide bracket is deflected by the tension of the strand so that the follower frequently rides out of the threaded grooves recessed portions on the spooling shaft and the spooling shaft is subjected to undue wear.

SUMMARY OF THE INVENTION

The present invention is directed to a strand winding device that includes a floating connection between the spooling nut and the guide bracket that moves transversely thereacross. With this arrangement, deflection of the bracket guide by the tension of the strand is taken up in the floating connection and not transmitted through the spooling nut to the spooling shaft. The radial deflection previously imparted to the spooling shaft by the guide bracket is now eliminated.

Accordingly, the principal object of this invention is to eliminate the radial deflection of the spooling shaft in a strand winding apparatus when the guide bracket is deflected transversely to the longitudinal axis of the spooling shaft.

Another object of this invention is to reduce the wear of the spooling shaft by deflection of the guide bracket.

A further object of this invention is to provide a spooling device wherein the indexing pin is supported on a nut positioned within the cable guide bracket and the nut is operable to permit deflection of the cable guide bracket relative thereto without transmitting the deflection to the spooling shaft.

These and other objects and advantages of this invention will be more completely disclosed and described in the following specification, the accompanying drawings and the appended claims.

DESCRIPTION OF THE PREFERRED EMBODIMENTS

Figure 1:
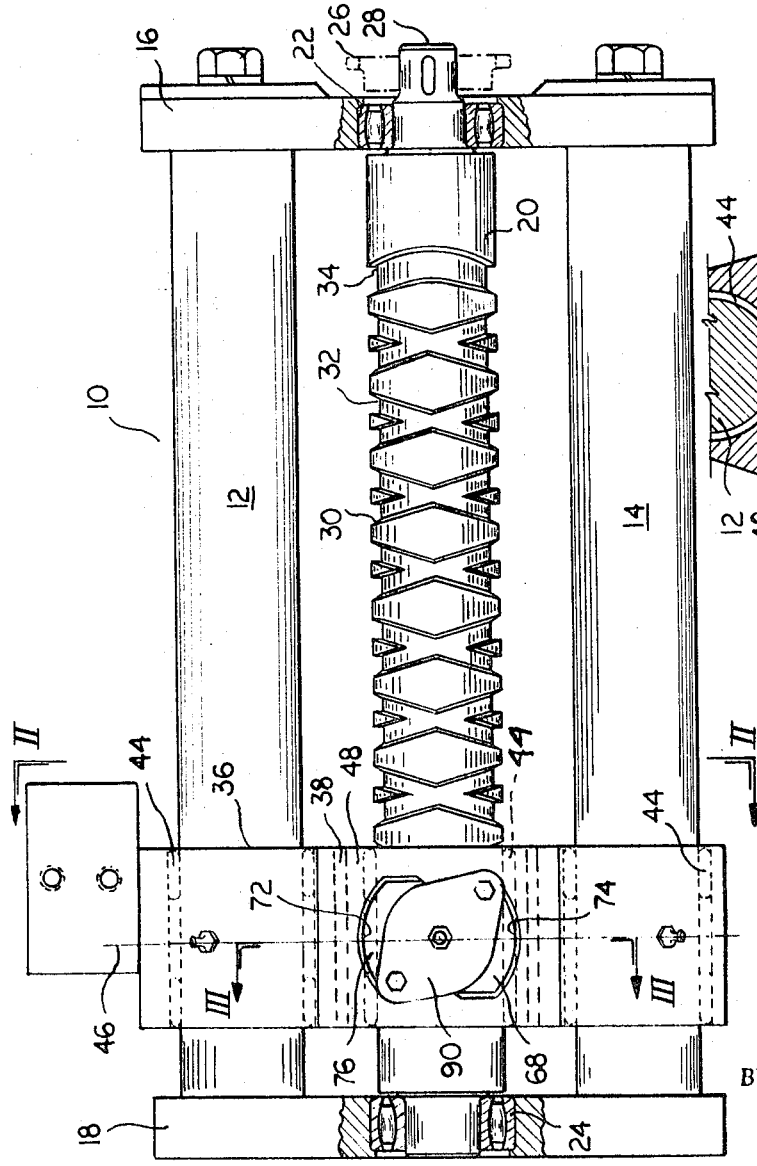
FIG. 1 is a fragmentary view in elevation of the spooling device for strand winding apparatus.

There is illustrated in FIG. 1 a spooling device generally designated by the numeral 10 that is associated with a driven takeup and storage reel for cable or the like. A takeup reel and the manner in which it is connected to the spooling device is illustrated in U.S. Pat. No. 2,134,369. U.S. Pat. No. 3,403,797 in FIGS. 18 and 19, illustrates a spooling device associated with a cable reel and arranged to distribute the cable along the length of the reel.

The spooling device 10 includes a pair of spaced rods 12 and 14 positioned in parallel overlying relation and secured in spaced end plates 16 and 18. A spooling shaft 20 is rotatably mounted in bearings 22 and 24 in end plates 16 and 18 between the rods 12 and 14 in parallel relation thereto. A sprocket 26 is secured to the end portion 28 of spooling shaft 20 and is arranged to rotate shaft 20 at a preselected velocity.

As illustrated in U.S. Pat. Nos. 2,134,369 and 3,403,797, the sprocket 26 is connected to a sprocket on the cable reel by an endless chain so that the cable reel and spooling shaft rotate together at preselected velocities. The spooling shaft 20 has right- and left-hand grooves or threads 30 and 32 respectively with arcuate end grooves 34 only one of which is illustrated.

A cable guide bracket generally designated by the numeral 36 is arranged to reciprocate on the rods 12 and 14 upon rotation of spooling bracket 20 by engagement of a portion of bracket 36 in the right- or left-hand grooves 30 and 32. When the bracket 36 traverses to a position adjacent the side frames 16 or 18, the element engaging the grooves is directed into the arcuate end groove 34 and shifted to engage the opposite handed grooves for traverse in the opposite direction along the spooling shaft 20. The cable guide bracket 36 is arranged to guide the cable or flexible strand as it is wound onto a reel to distribute the cable transversely across the reel. The cable guide bracket 36 has an intermediate generally rectangular bore 38 and a pair of cylindrical end bores 40 and 42. The cable guide bracket 36 has the rods 12 and 14 extending through the respective bores 40 and 42 with bushings 44 positioned therebetween. With this arrangement, the cable guide bracket 36 that has a longitudinal axis 46 is arranged to reciprocate on the rods 12 and 14 with the guide bracket longitudinal axis 46 substantially perpendicular to the longitudinal axis of the rods 12 and 14.

Figure 2:
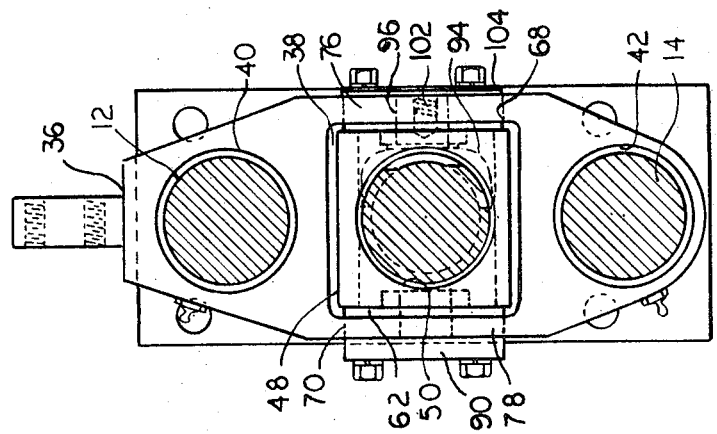
FIG. 2 is a view in side elevation and partly in section taken along the line II–II in FIG. 1.
Figure 3:
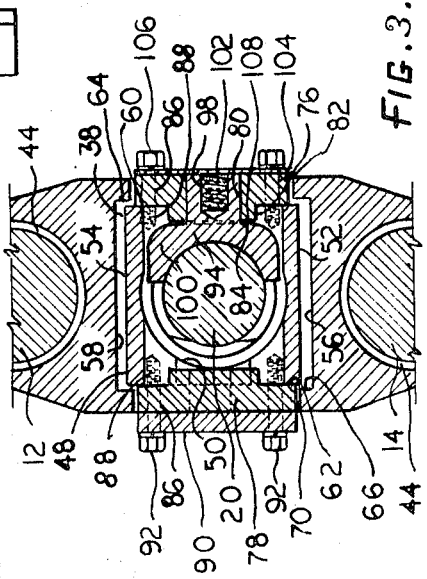
FIG. 3 is a fragmentary view in section and elevation taken along the line III–III in FIG. 1 further illustrating in detail the floating connection between the guide bracket and the spooling shaft.

A nut 48 having a generally rectangular configuration with a transverse cylindrical bore 50 therethrough is positioned in the rectangular bore 38 of guide bracket 36. The nut 48 has horizontal sidewalls 52 and 54 which are spaced inwardly from the horizontal sidewalls 56 and 58 of the guide bracket rectangular bore 38. The nut 48 has vertical end walls 60 and 62 which are spaced from the guide bracket rectangular bore vertical end walls 64 and 66. With this arrangement, the rectangular nut 48 is smaller than the rectangular bore 38 in the guide bracket 36 so that the nut 48 has limited movement in all directions when positioned in the bore 38. As illustrated in FIGS. 2 and 3, the diameter of bore 50 in nut 48 is larger than the diameter of the spooling shaft 20. Bushings 44 are positioned in the annular spaced between the shaft 20 and nut 48 to maintain the radial relationship therebetween and the coaxial relationship of the nut 48 on the shaft 20.

The guide bracket 36 has aligned side openings 68 and 70 into the rectangular bore 38 with arcuate walls 72 and 74. A pair of guide members 76 and 78 are positioned in the the openings 68 and 70 as is illustrated in FIG. 3. The guide members 76 and 78 have arcuate walls of substantially the same configuration as the arcuate walls 72 and 74 of openings 68 and 70. The guide members 76 and 78 each have an axial passageway 80 and an inner annular lip portion 82 forming an inner annular end surface 84. The guide members 76 and 78 have a plurality of bolt holes 86 therein that are aligned with threaded bolt holes 88 in the nut 38. A retainer plate 90 is positioned in overlying relation with the guide member 78 and bolts 92 extend through aligned bolt passageways in retainer member 90 and guide member 78 and are threadedly secured in the bolt apertures 88 of nut 48 to secure the guide member 78 to the nut 48.

An indexing pin generally designated by the numeral 94 has a cylindrical head portion 96 with an axial bore 98 therein and an arcuate section 100 that extends into the groove portions of the spool shaft 20. The indexing pin 94 has the cylindrical head portion 96 rotatably positioned in the axial bore 80 of guide 76 so that the indexing pin 94 is pivotable relative to the guide 76 and the bracket 38. A coil spring 102 is positioned in the axial bore of pin 94, and a retainer plate 104 illustrated in plan in FIG. 1 is positioned in overlying relation with the upper surface of guide 76 and exerts a compressive force on the coil spring 98 to thus urge the arcuate end portion 100 of pin 94 into the grooves 30 or 32. The retainer plate 104 is secured to the guide member 76 and nut 48 by bolts 106 extending through bolt apertures in the retainer plate 104 and apertures 86 in guide 76 into threaded bores 88 in the nut 48.

There is a space 108 between the outer surface of the indexing pin arcuate end portion 100 and the annular end surface 84 of guide member 76. The space 108 prevents frictional resistance between these surfaces and permits free pivotal movement between pin 94 and the guide member 76. With this arrangement, the indexing pin 94 is pivotally supported in the guide member 76 and the arcuate end portion 100 is urged into the spool shaft grooves by the spring 102.

The external dimensions and configuration of the nut 48 and the dimensions and configuration of the rectangular bore 38 permit the nut 48 to float in the guide bracket bore 38 and to take up any deflection of the guide bracket 36 and prevent this deflection from being transmitted through the nut 48 to the spool shaft 20. With this arrangement of the nut 48 within the rectangular bore 38 of bracket 36, the nut can only be subjected to forces parallel to the longitudinal axis of the spooling shaft. Forces due to cable tension exerted on the bracket 36 tend to deflect the bracket 36 angularly relative to the longitudinal axes of the spooling shaft 20. Without the floating connection between the nut 48 and the bracket 36 the above forces would be transmitted as radial forces or moments to the spooling shaft and, as previously discussed, subject the spooling shaft to undue wear and damage to the grooves and groove follower. With the floating connection between the nut and the bracket, however, the forces due to cable tension on the bracket 36 can not be transmitted to the floating nut. This arrangement reduces the load on the bushings that align the indexing pin with the spooling shaft so that the spooling shaft turns more freely under heavy loading and the bushing wear associated with misalignment and heavy loading is substantially reduced, thus providing longer useful life for the spooling device 10.

Although the spooling device 10 is described with one guide member positioned above the other so that FIG. 1 is a view in elevation, it should be understood that the spooling device may be positioned otherwise without affecting the operation of the spooling device. As for example the spooling device may be positioned horizontally where FIG. 1 would be a view in plan.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. In a spooling device for distributing a flexible strand along more than one length of traverse while being wound on a reel comprising:
    a frame member having a pair of guide rods and a pair of end plates maintaining said guide rods in parallel spaced relation to each other;
    a spool shaft rotatably mounted in said end plates between said parallel guide rods, said spool shaft having a cylindrical external surface with left- and right-hand threaded grooves formed therein;
    a strand guide bracket mounted on said frame member for transverse movement relative to said guide rods, said guide bracket having a transverse bore therethrough with an internal surface;
    a spooling nut having an external surface and a central aperture therethrough;
    an indexing pin pivotally secured in said spooling nut central aperture and extending into one of said threaded grooves, said indexing pin arranged to follow one of said threaded grooves upon rotation of said spool shaft to move said spooling nut longitudinally on said spooling shaft; and
    means securing said spooling nut within said guide bracket bore so that said guide bracket may deflect radially relative to said spooling shaft without transmitting said radial deflection to said spooling shaft.

2. In a spooling device as set forth in claim 1 in which, said guide bracket bore and said spooling nut are so dimensioned that said spooling nut external surface is spaced from said guide bracket internal surface.

3. In a spooling device as set forth in claim 1 in which:
    said guide bracket bore has a generally rectangular configuration with a pair of parallel sidewalls;
    said spooling nut having a generally rectangular configuration with a pair of parallel sidewalls; and
    said spooling nut sidewalls spaced from said guide bracket bore sidewalls.

4. In a spooling device as set forth in claim 3 in which:
    said guide bracket bore has a pair of parallel end walls and said spooling nut has a pair of parallel end walls; and
    said spooling nut end walls spaced from said guide bracket end bore end walls to prevent transmission of said radial deflection from said guide bracket to said spooling shaft through said spooling nut.

5. In a spooling device as set forth in claim 1 which includes resilient means urging said indexing pin into one of said grooves.

6. In a spooling device as set forth in claim 1 in which:
    said guide bracket includes aligned openings into said transverse bore; and
    a pair of guide members positioned in said openings and secured to said spooling nut to thereby retain said spooling nut within said guide bracket transverse bore.

7. In a spooling device as set forth in claim 6 in which:
    one of said guide members has a cylindrical passageway therein; and
    said indexing pin including a cylindrical head portion and an arcuate end portion, said head portion positioned in said guide member passageway and arranged to rotate therein, said arcuate portion positioned in one of said spool shaft threaded grooves.

8. In a spooling device as set forth in claim 6 in which:
    said guide bracket openings have arcuate sidewalls and said guide members have arcuate sidewalls of substantially the same configuration;
    retainer means positioned in overlying relation with said guide members; and
    means securing said retainer means to said spooling nut.